United States Patent [19]

Paccagnella

[11] Patent Number: 5,073,792
[45] Date of Patent: Dec. 17, 1991

[54] MACHINE FOR THE CONTINUOUS CONTACT EXPOSURE OF PHOTOSENSITIVE MATERIALS

[76] Inventor: Giuseppe Paccagnella, Via Vigolo 94, Vicenza, Italy, 36100

[21] Appl. No.: 528,188

[22] Filed: May 24, 1990

[30] Foreign Application Priority Data

May 24, 1989 [IT] Italy ............................. 85593 A/89
Jul. 25, 1989 [IT] Italy ............................. 85624 A/89

[51] Int. Cl.⁵ ............................................ G03B 27/04
[52] U.S. Cl. ...................................... 355/97; 355/103
[58] Field of Search ................... 355/103, 78, 79, 97, 355/48, 50

[56] References Cited

U.S. PATENT DOCUMENTS 4,566,787 1/1986 Lüllau ............................. 355/100

Primary Examiner—Brian W. Brown
Assistant Examiner—Khanh Dang
Attorney, Agent, or Firm—Wenderoth, Lind & Ponack

[57] ABSTRACT

The present invention relates to a machine for facilitating the continuous exposure of laminar photosensitive materials placed in contact with original films. The machine includes a planar slit through which the photosensitive materials are guided, the slit being defined by a rigid planar plate of light-transparent material which is superposed on a flexible supporting and sliding surface and acts thereon with a predetermined force to ensure the contact of the photosensitive materials. Light-emitting devices are further located beyond the plate on the side opposite to the supporting surface, and at least one pair of motorized conveyor rollers is arranged upstream of the inlet of the guiding slit for continuously advancing the photosensitive materials. The face of the plate which is directed toward the guiding slit has a uniform distribution of optically transparent surface discontinuities which are adapted to prevent the formation of a vacuum and to avoid the adhesion of the contact surfaces of the films with the face of the plate. The supporting surface includes an at least partially inelastic pad which automatically adapts to the shapes and thicknesses of the photosensitive materials. The conveyor rollers have rigid cores with soft elastic coverings and are mounted on fixed supports which are optionally adjustable to change a center-to-center distance strictly smaller than the each outer diameter thereof.

20 Claims, 4 Drawing Sheets

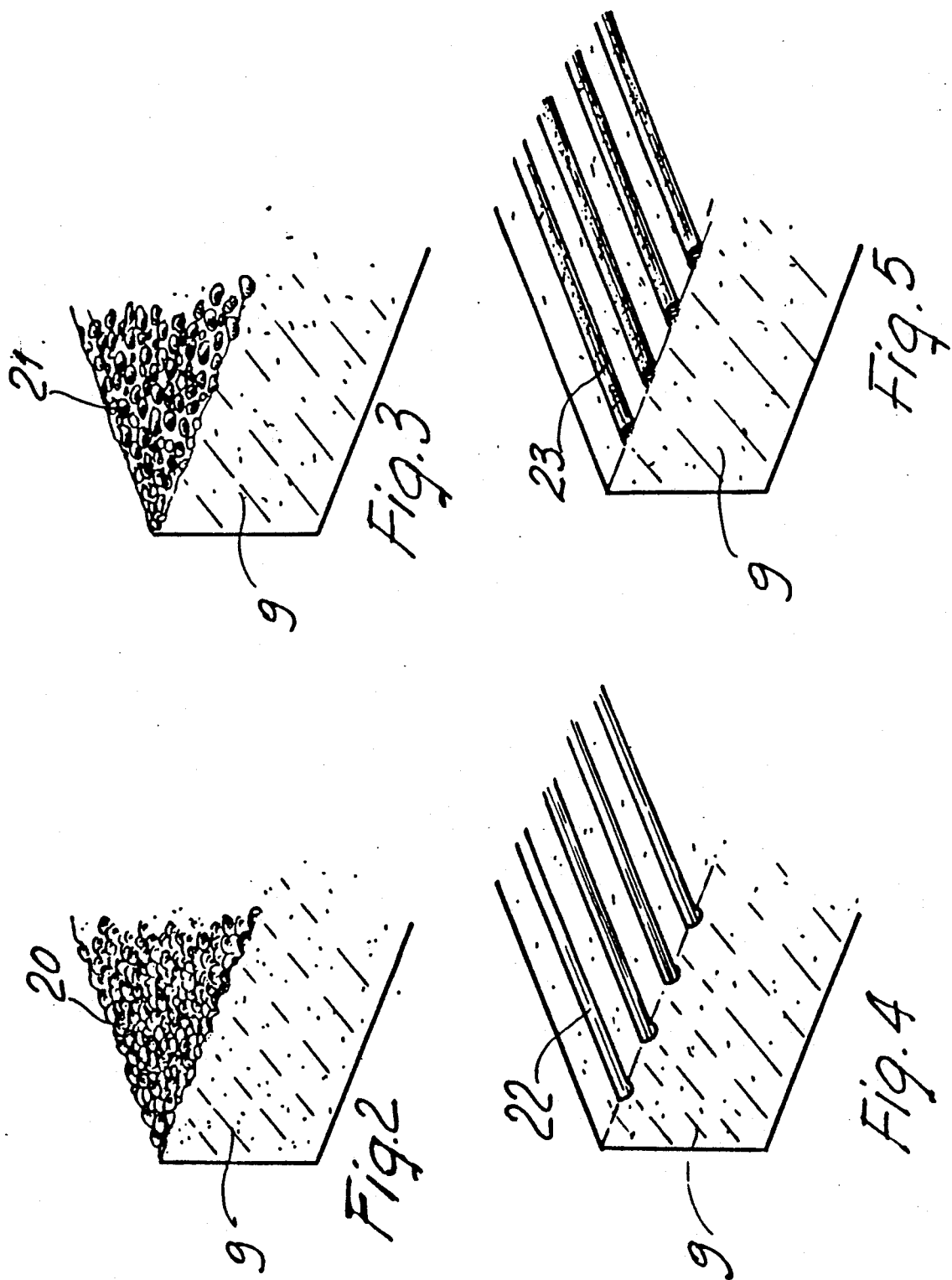

MACHINE FOR THE CONTINUOUS CONTACT EXPOSURE OF PHOTOSENSITIVE MATERIALS

BACKGROUND OF THE INVENTION

1. Field of the Invention

The present invention relates to a machine for carrying out the continuous contact exposure of photosensitive laminar products.

Such a machine is applicable to photographic reproduction devices in which sheets of photosensitive material are placed in direct contact with original films and then subjected to irradiation produced by light sources.

2. Description of the Related Art

Machines of this type are known which operate continuously by means of the advancement of the photosensitive materials along planar guiding slits. In particular, a planar-guide device is known and described in European patent application EP-A-117,294; said device comprises a guiding slit defined between walls constituted by planar flexible laminae which have an extremely low coefficient of friction, a planar glass plate which rests on an elastically yielding supporting planar surface, and at least one pair of traction rollers arranged upstream and possibly downstream of the guiding slit. Said rollers have, on their cylindrical surfaces, peripheral grooves which are traversed by rectilinear tabs which extend from the guiding slit, in particular from its inlet portion.

This machine facilitates the insertion of the photosensitive materials across the inlet of the slit and the advancement of said materials through the initial portion of the slit. However, the prior art machine is not free from disadvantages, which include, amongst others, the fact that the elastic reaction of the supporting planar surface providing a relatively large contact surface generates a resistance to the advancement of the materials which increases progressively and may cause the materials to travel through the slit along an irregular and non-rectilinear path and, in the worst cases, may cause the stoppage and damage thereof. This disadvantage is further increased when a plurality of original sheets superposed on the photosensitive materials are to be exposed, as frequently occurs in the montage of photosensitive plates employed in the graphic arts industry. In this case, in fact, the thickness of the original films associated with the sheets of photosensitive material becomes significant and can give rise to a total or local adhesion owing to the formation of a vacuum between the sliding surfaces. Rollers provided with grooves furthermore have, due to the grooves themselves, a small contact and thrust surface with respect to the supporting planar surface and the progressively increasing contact surface provided thereby.

In the above-mentioned exposure of a plurality of original sheets superposed on the photosensitive material, the thickness of the originals associated with sheets of photosensitive material is considerable and it is therefore necessary to make use of pairs of rollers adjustably spaced under gravity in order to provide a passage slit of adjustable variable thickness by leaving the upper rollers movable.

This gives rise to two further disadvantages, and specifically a play in the gears connecting each pair of rollers, since the axial distance of the gears can increase until the gears are no longer meshing along their pitch lines.

This drawback causes exposure defects, since the original and the photosensitive material no longer travel in register, but advance misaligned under traction.

Another disadvantage of these grooved rollers adjustably spaced under gravity arises from the fact that when the assembly formed by the original and the sensitive material are inserted across the inlet in a position thereof out of center in the widthwise direction, the rollers are no longer parallel to each other, thus causing the motion of the material to be exposed to be no longer rectilinear but directed to the right or to the left depending on the position of the rollers. Consequently, the original and photosensitive material are damaged to a degree which can even bring about the stoppage of the machine.

But the most serious drawback of these known machines consists of the need to provide rollers which are perfectly identical. In fact, in the event that the rollers of a pair are not perfectly identical, the motion of the original film is different from that imparted to the sensitive material. Consequently, an offset in images occurs. In the case of a plurality of pairs of rollers, the situation becomes even more complicated, since different localized tensions are exerted on the materials. Consequently, misalignments, defects and breakages thereof occur. It is to be noted that these tensions are consequent to differences in the peripheral speed of the rollers which are in turn caused by variations in the outer diameters of the rollers.

In fact, a difference of only one hundredth of a millimeter in the diameter of a ground rubber roller is sufficient to create a difference of 3.14 hundredths of a millimeter at every turn. After 10 turns, 3.14 tenths of a millimeter of off-register will occur, i.e. an absolutely unacceptable misalignment of the reproduced images. The above described defects are worse in grooved rollers but are also present in conventional cylindrical rollers.

Tolerances in the range described above are additionally unfeasible in the grinding of rollers covered with elastomers, due to elasticity of these materials and to the considerable coefficient of thermal expansion combined with the low melting point thereof.

SUMMARY OF THE INVENTION

The object of the present invention is to eliminate the disadvantages described above by providing a machine for facilitating the continuous contact exposure of photosensitive materials which ensures a high degree of reliability in the advancement of the materials along a linear path during exposure.

A particular object of the present invention is to significantly reduce the resistance to the advancement of the materials while allowing a high contact pressure which is necessary in order to eliminate the air interposed between said materials.

A further object of the present invention is to cause identical traction to be imparted to the materials by each roller of at least two pairs thereof.

Another particular object is to ensure the parallelism of the rollers even upon the insertion of materials having considerable thicknesses, so that the conveyance of such materials is always rectilinear without lateral deviations.

Another object of the present invention is to provide a machine wherein the insertion of the original and of the photosensitive material in the exposure slit is easy and safe, and wherein the thrust imparted to the assembly comprising the original and the photosensitive material is maximal.

Not least, another object of the invention is to provide a machine for facilitating continuous exposure which can be easily fabricated from commonly commercially available elements and materials and is furthermore advantageous from a merely economical point of view.

These objects and others which will become apparent hereinafter are achieved by a machine for facilitating the continuous exposure of laminar photosensitive materials in contact with original films, which machine comprises a planar guiding slit through which said photosensitive materials are conveyed, said slit being defined by a rigid planar plate made of light-transparent material superposed on a flexible sliding surface having a low coefficient of friction, light-emitting means arranged beyond said plate on the side opposite to said sliding surface, at least one pair of motorized conveyor rollers arranged upstream of the inlet of said slit for continuously advancing said photosensitive materials, characterized in that the surface of said plate which is directed toward said photosensitive materials has a uniform distribution of optically transparent surface discontinuities which are adapted to prevent the formation of a vacuum and adhesion between said surface and said photosensitive materials.

According to a further aspect of the invention, an at least partially inelastic flexible pad is provided below said sliding surface and automatically adapts to the shapes and thicknesses of said photosensitive materials.

According to another aspect, said conveyor rollers are composed of a steel core covered with a relatively thick covering of soft or foamed elastomeric material. The rollers are preferably mounted on adjustable supports so that the center-to-center distance of each pair is perfectly identical to that of the other pairs and is always smaller than the outer diameter of the elastomeric covering.

The advantages exhibited by the present invention mainly relate to the reduced resistance to the advancement of the photosensitive laminar products. Furthermore, the adoption of the soft or foamed rollers achieves perfect uniformity in the translatory motion of all of the rollers which form the pairs, since advancement is no longer conditioned upon the diameter of said roller but upon the center-to-center distance of the pair. The high elasticity and softness of the covering is such that the diameters of the rollers promptly reduce according to the center-to-center distance adopted; and this center-to-center distance determines the diameter and the area of contact. In this manner a uniform traction is exerted by the two rollers constituting each pair. Furthermore, since the center-to-center distance of the rollers is obtained by precise mechanical operations, it is easy to keep it within narrow tolerance limits and it is also possible to adopt a high-precision adjustment. This ensures identical translatory motion even with multiple pairs of rollers.

Also the problem of inserting a plurality of superposed originals with a remarkable thickness is easily solved, since the elastic soft coverings of the rollers easily accommodate these irregularly distributed thicknesses, and the fixed axes do not allow for the parallelism of the translatory motion to be varied even for original films of considerable length.

Another advantage of rollers with soft coverings resides in the fact that as the center-to-center distance of each pair is always smaller than each of the respective outer diameters thereof, the two rollers undergo an elastic compression which generates a substantially planar contact region of a considerable extent instead of a substantially linear contact area as occurs in hard rollers.

BRIEF DESCRIPTION OF THE DRAWINGS

Further characteristics and advantages will become apparent from the detailed description of a preferred, but not exclusive, embodiment of a machine for facilitating continuous exposure according to the invention, illustrated only by way of a non-limitative example in the accompanying drawings, wherein:

FIGS. 2 to 5 are partial perspective views, respectively, of embodiments of a transparent plate of the machine of FIG. 1;

DETAILED DESCRIPTION OF THE PREFERRED EMBODIMENT

Figure 1:
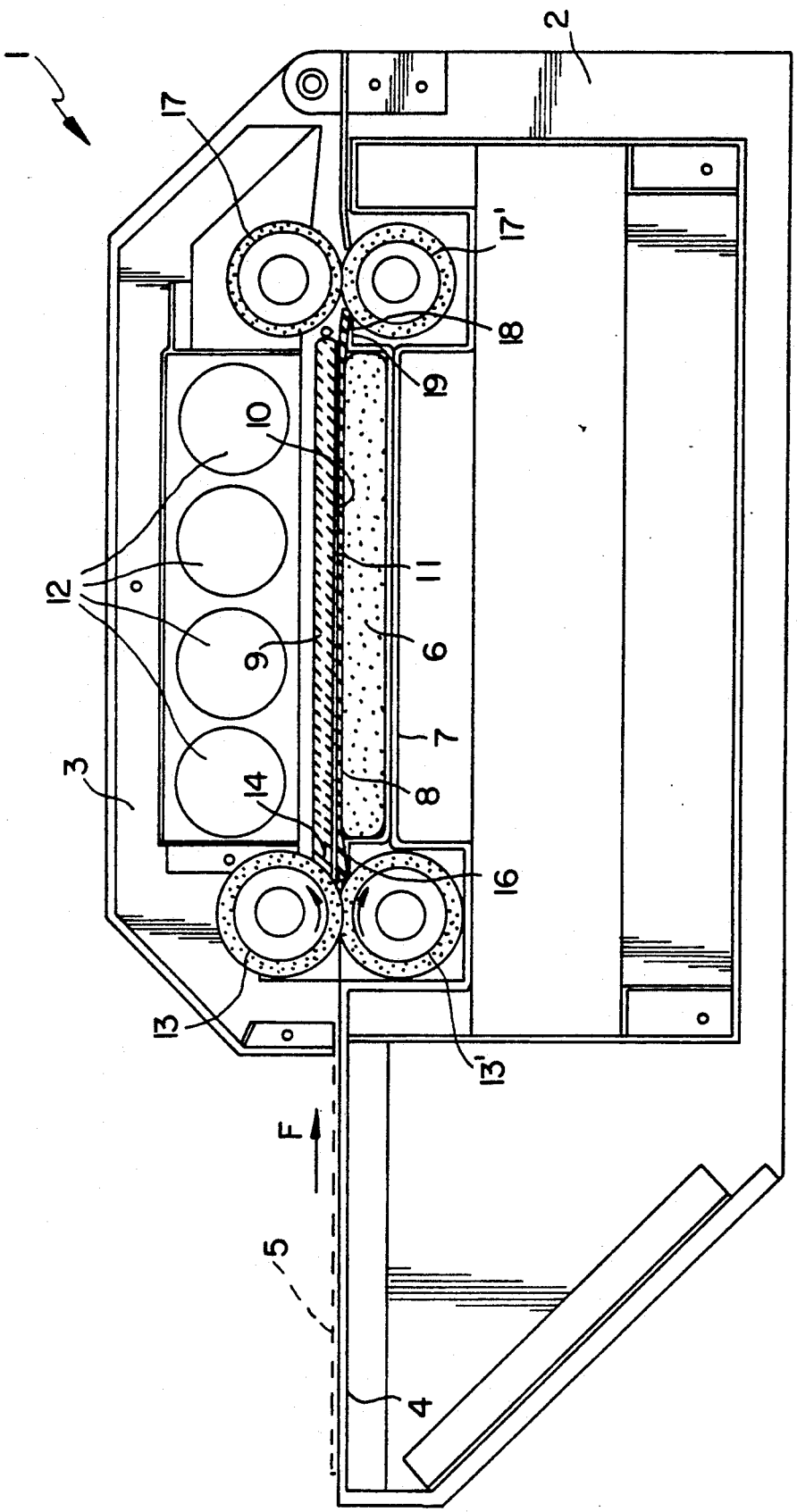
FIG. 1 is a sectional side view of the machine for facilitating continuous exposure according to the invention.

With reference to the above figures, the machine for facilitating continuous exposure according to the invention, generally indicated by the reference numeral 1, comprises a supporting framework 2 which is formed by sturdy crosspieces and side members preferably made of aluminum alloy. The supporting framework 2 is enclosed by sheet metal walls also preferably made of aluminum alloy, and is surmounted by the actual exposure chamber, generally indicated by reference numeral 3. In the front part of the machine, to the left in FIG. 1, there is a loading platform 4 on which the laminar photosensitive materials, schematically indicated in broken lines and generally indicated by reference numeral 5, rest before entering the exposure chamber 3. In particular, the materials 5 may comprise one or more plates of original films superposed on a sheet of photosensitive material.

A substantially planar supporting pad 6, which will be described in greater detail hereinafter, is provided in the internal compartment of the exposure chamber 3 and rests on a planar and horizontal sheet metal bottom 7 which is fixed to the crosspieces of the supporting framework 2.

A layer 8 made of flexible material is arranged above the pad 6, and its upper face forms a supporting and sliding surface at which the photosensitive materials are to be exposed. A planar and horizontal plate 9, made of glass or of another rigid and lightweight transparent material, is arranged above the flexible layer 8, and its lower face 10 defines, together with the supporting surface 8, a sliding and guiding slit 11 through which the photosensitive materials 5 are conveyed.

A plurality of light sources 12 is arranged above the glass plate 9 to irradiate the photosensitive materials during advancement thereof along the guiding slit 11. Said fluorescent lamps 12 provide irradiation over the entire length of the guiding slit. Preferably, at least four light sources 12 are provided in a preferred embodiment.

The advancement of the photosensitive materials along the guiding slit in the direction indicated by the arrow F of FIG. 1 is accomplished by at least one pair of motorized conveyor rollers 13, 13' which rotate about axes which are perpendicular to the direction of advancement and are arranged to the front of an inlet end of said slit in a position which is adjacent to the resting platform 4. In order to facilitate the insertion of the sheets of photosensitive material in the guiding slit, the inlet section of said slit is provided as close as possible to the line of contact of the conveyor rollers 13, 13'. In particular, the edge 14 of the transparent plate 9 is inclined with respect to the horizontal so as to have a substantially wedge-like configuration. On the opposite side of the guiding slit, the inlet edge of the supporting surface 8 is fixed to a strip 16 which extends to the front of flexible pad 6.

A planar connecting surface, not illustrated in the drawings, may be provided between the resting platform 4 and the inlet of the wedge-like passage defined by the conveyor rollers 13 and 13'. The exit of the photosensitive materials 5 from the guiding slit 11 may optionally be ensured by a second pair of traction rollers 17, 17' which also have rotation axes which are transverse to the direction of advancement and are arranged immediately downstream of said slit. Since the exiting of the materials from the slit is not as critical as their entry, it is sufficient that only the supporting surface 8 extends beyond the downstream end of the transparent plate 14, the end portion 18 of the supporting surface being fixed to a strip 19 rigidly associated with the supporting framework 2.

A particular feature of the present invention consists in that the lower face 10 of the transparent plate 9 has a uniform distribution of optically transparent surface discontinuities which are adapted to prevent the formation of a vacuum and the adhesion of the materials 5 thereto, and in particular of the originals, to said face 10.

These surface discontinuities may be provided in various forms, examples of which are depicted in FIGS. 2 to 5.

Figure 8:
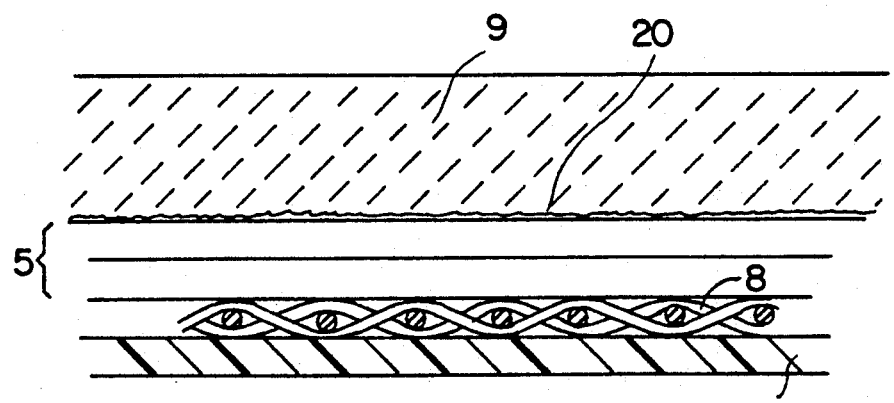
FIG. 8 is a sectional and highly enlarged view of a portion of a guiding slit of the machine of FIG. 1.

In particular, in FIG. 2 the surface discontinuities appear in the form of surface micro-projections 20 having rounded tops. As more clearly illustrated in FIG. 8, the tops of the micro-projections 20 set apart the surface in contact with the photosensitive materials 5 so as to create minute air chambers which prevent the formation of a vacuum and a surface adhesion phenomena. The micro-projections 20 can be obtained by means of chemical etching processes, for example using silk-screening techniques.

FIG. 3 illustrates a second example of surface discontinuities which consist of micro-cavities 21 which are open on the surface and can be obtained by means of a molding process or by casting glass on appropriately prepared surfaces.

The surface discontinuities illustrated in FIG. 4 consist of grooves 22 which are generally rectilinear but may have a different continuous or discontinuous shape in a longitudinal or partially transverse direction with respect to the direction of advancement of the photo-sensitive materials. Also in this case the grooves 22 may be obtained by means of mechanical or chemical processes within the grasp of any skilled person in the art.

FIG. 5 finally illustrates a last example of the surface discontinuities, which consist of transparent material 23 superposed on plate 9 by, for example, deposition, printing, cold- or hot-gluing and other equivalent techniques. Polyester or acrylic or other transparent resins may be used for this transparent material.

In general, the dimensions of said surface discontinuities must be extremely small, in the range of at the most a few tenths of a millimeter, in order to minimize the partial reflection of light, thus preventing negative effects on the irradiation of the photosensitive materials.

According to a further peculiar characteristic of the present invention, the flexible pad 6 arranged below the supporting surface 8 is at least partially inelastic so as to adapt to the shape and thickness of the photosensitive materials which move along the guiding slit 11.

Figure 6:
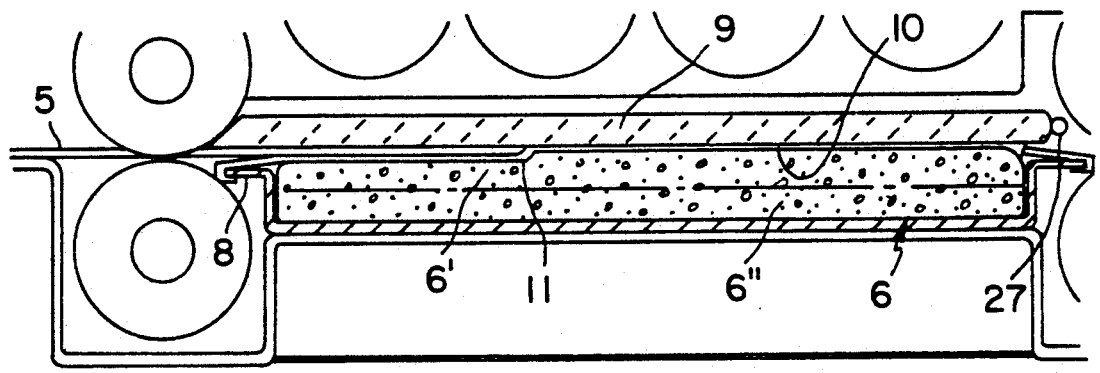
FIG. 6 is a sectional side view of a first embodiment of a supporting pad of the machine of FIG. 1.

Advantageously, according to the invention, the pad 6 can be formed of a material with a differentiated structure, at least partially provided with elastic memory. As can be seen in FIG. 6, the flexible pad 6 is formed by an upper layer 6', made of foamed resin with partially closed cells, superposed on a lower layer 6'' made of open-cell foamed resin. Whereas the behavior of the lower layer 6'' is essentially resilient if a compressive force is exerted by the photosensitive materials in a transverse direction with respect to their plane of arrangement, the closed cells of the foamed resin layer 6' behave in a partially inelastic manner, assuming temporary deformations upon the passage of the photosensitive materials. Consequently, the surface layer 6' exerts on the photosensitive materials 5'' in contact therewith, an extremely limited compression reaction which, combined with the anti-adhesive effect of the surface discontinuities of the transparent plate 9, significantly reduces the resistance of the photosensitive materials 5 to advance through the sliding slit 11.

Figure 7:
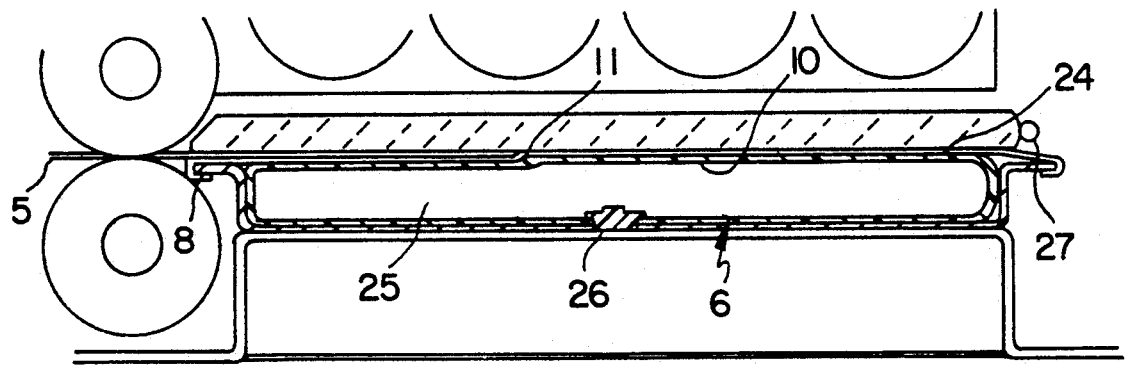
FIG. 7 is a side view of a second embodiment of a supporting pad.

FIG. 7 illustrates another form of the flexible supporting pad 6, which consists essentially of a planar container 24 which is hermetically closed, is formed by low-thickness flexible walls and is entirely filled with a non-compressible fluid 25, possibly introduced or refilled through an automatic valve 26. In this case, the walls of the container 24 deform instantly upon the passage of the photosensitive materials, offering a negligible resistance to their advancement, though they ensure optimum contact conditions of said materials with one another and against the transparent plate 9. Water with the addition of imputrescible or anti-fermentation materials such as for example quaternary salts, or, as an alternative, mineral oils and other high-viscosity or thixotropic liquids, may be used as non-compressible fluid to render the behavior of the pad even more inelastic. The walls of the flexible container 24 may consist of thin sheets of plastic material such as polyethylene or polyvinyl resins.

In order to drastically reduce the contact area, the sliding surface 8 may be formed by a layer of fabric made of synthetic fibers with a low coefficient of friction, such as single- or multi-filament nylon yarns, fibers of polyester, Teflon, Goretex (Trade Mark) and other similar materials. In this manner the actual area of contact will be limited to the raised portions of the weft and warp threads of the fabric, which can provide very small percentages of the total surface, i.e. between 20% and 40%.

The walls of the transparent plate 9 and the sliding surface 8, which define the guiding slit 11, may be advantageously covered by a layer of anti-friction materials such as silicon solutions or other similar materials.

The sliding surface 8 may be covered underneath by a waterproof layer of phenolic resins, of spreads of PVC or thermal adhesives, by polyurethane layers which are self-adhesive, not-applied or coupled to the fabric. This property can be used to locally form openings for the passage of developing vapors used in the blueprinting technique, which are emitted from a tank, not illustrated in the drawings, which is specifically provided for this purpose and is arranged adjacent to and rearwardly of the pad 6.

Finally, it should be noted that the pressure exerted by the transparent plate 9 on the photosensitive materials 5 is determined by the plate's own weight; the plate is simply resting upon the pad 6 and is prevented from displacing in the direction of advancement by a bar 27 which is fixed to the supporting framework of the machine.

According to a further aspect of the present invention, the rollers of the pairs 13, 13' and 17, 17' arranged at the inlet and at the outlet of the exposure slit, are respectively formed by a metal core 30 covered by soft elastic or soft foamed material 31.

Figure 9:
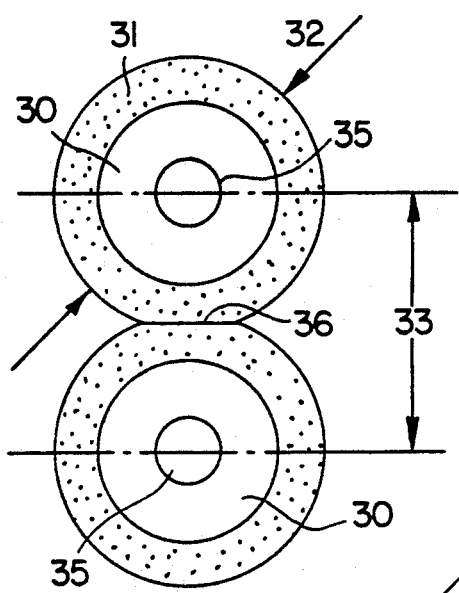
FIG. 9 is an enlarged sectional view of a pair of rollers of the machine of FIG. 1.
Figure 10:
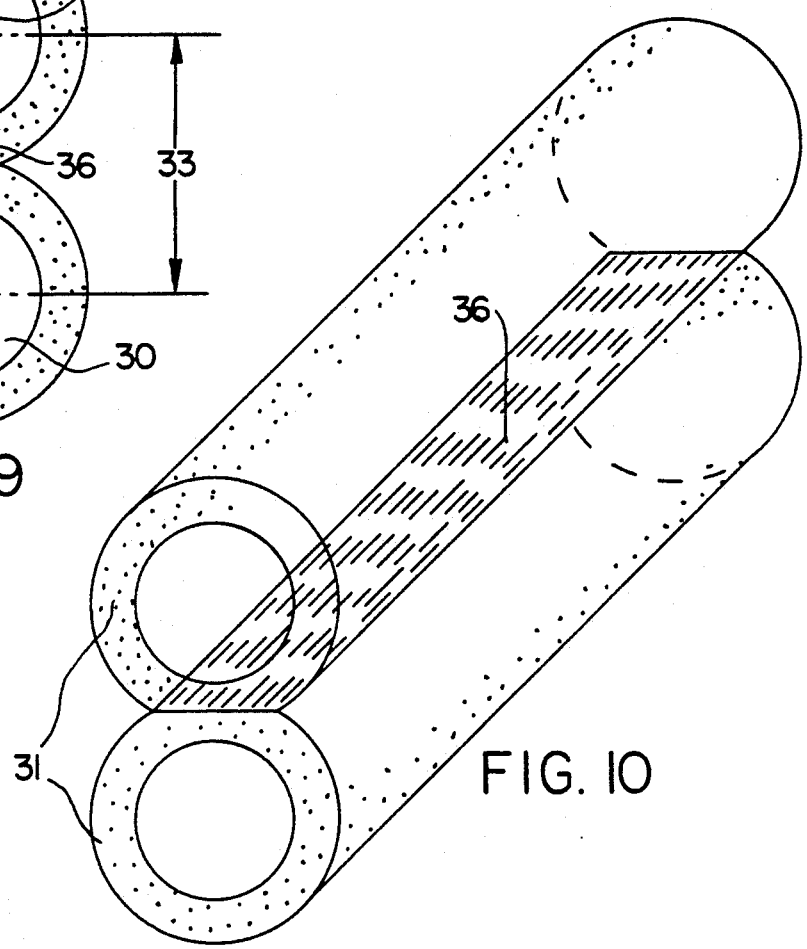
FIG. 10 is a schematic perspective view of the pair of rollers of FIG. 9.
Figure 11:
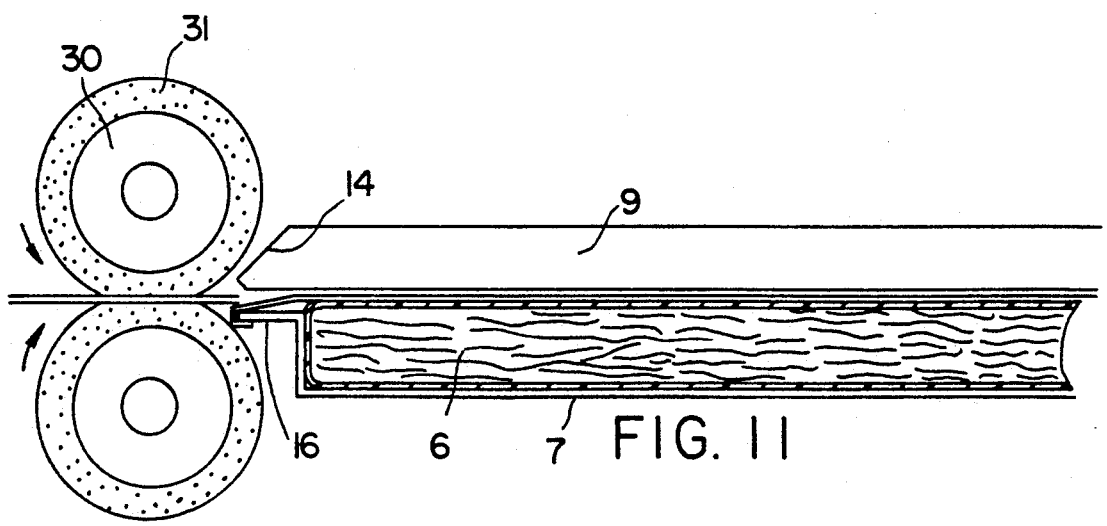
FIG. 11 is a schematic view of the behavior of the pair of rollers of FIGS. 9 and 10 during a photosensitive material insertion step.

As shown in FIGS. 9 to 11, the rollers have end pivots 35 which are rotatably supported in seats having fixed positions which can possibly be adjusted by adjustment means, known per se and therefore not illustrated in the drawings. The positions of the pivots 35 are such that the center-to-center distance 33 is always smaller than each diameter 32, producing the compression of the rollers which generates a plane of contact 36. From this it is evident that even small differences in the outer diameter of the rollers do not lead to substantial differences, since the rollers are subject to a fixed compression which is determined according to the center distance of the pivots 35 and entails an always constant advancement radius.

FIG. 10 illustrates, in a perspective view, the plane of contact 36 which is created between the rollers. The considerable surface of contact of the rollers allows a driving thrust associated with a perfect orientation of the inserted sensitive materials, which cannot deviate from the rectilinear path since they are perfectly guided.

FIG. 11 illustrates the insertion of the assembly, constituted by the original and the photosensitive material, into the guiding slit. This schematic illustration also shows another particular feature of the present invention which is related to the action exerted by the contact of the rollers on the original film and on the sensitive material, with the consequent ejection of air trapped therebetween, thus providing an absolutely horizontal orientation of the assembly, which is easily and safely inserted in the guiding slit.

From the foregoing description it can be seen that the invention achieves the intended objects and in particular the fact is stressed that the configuration and properties of the soft or foamed-elastomer traction rollers increase the surface of contact between the rollers and the materials to be exposed, rendering the advancement of said materials highly reliable, particularly in the presence of photosensitive sheets of the kind used in graphic industries.

Experimental tests carried out on the machine according to the invention have confirmed that the resistance to advancement is reduced by 25% to 50% with respect to other known machines, such as for example those of the kind described in EP-A-117,294. Furthermore, the pairs of soft rollers generate a driving thrust which is up to eight times greater than that obtained with an equal pressure but with the hard rubber rollers disclosed in EP-A-117,294.

A further advantage consists of the fact that the means used for the proposed solution are extremely simple and inexpensive and are extremely competitive from an economical point of view.

The invention thus conceived is susceptible to numerous modifications and variations, all of which are within the scope of the inventive concept defined by the accompanying claims.

All the details may furthermore be replaced with other technically equivalent elements.

In practice, the materials employed, so long as they are compatible with the specific use, as well as the contingent shapes and dimensions, may be selected according to predetermined requirements.

I claim:

1. A machine for use in continuously exposing laminar photosensitive materials in contact with original films, said machine comprising: a rigid planar plate made of light-transparent material; a flexible supporting and sliding surface having a low coefficient of friction superposed with said rigid planar plate so as to define a planar slit between a surface of said plate which confronts said sliding surface; light-emitting means, arranged beyond said plate to the side thereof opposite that confronting said sliding surface, for irradiating light through said plate; and at least one pair of motorized conveyor rollers provided upstream of an inlet end of said slit for continuously advancing photosensitive materials through said slit; the surface of said plate confronting said sliding surface having a uniform distribution of optically transparent surface discontinuities which are adapted to prevent the formation of a vacuum and to avoid adhesion between said surface of the plate and photosensitive materials to thereby reduce resistance to advancement thereof.

2. A machine according to claim 1, and further comprising an at least partially inelastic flexible pad, which automatically adapts to the shapes and thickness of photosensitive materials, disposed below said sliding surface.

3. A machine according to claim 1, wherein said discontinuities consist of micro-projections which have rounded tops.

4. A machine according to claim 1, wherein said discontinuities consist of micro-cavities.

5. A machine according to claim 1, wherein said discontinuities consist of grooves which extend longitudinally and/or transversely of a direction in which the conveyor rollers advance photosensitive materials in the machine.

6. A machine according to claim 1, wherein said discontinuities consist of strips of transparent materials which extend longitudinally and/or transversely a direction in which the conveyor rollers advance photosensitive materials in the machine.

7. A machine according to claim 2, wherein said pad comprises material having a partial elastic memory, said material consisting of a layer of foamed resin with at least partially closed cells superimposed on a layer of foamed resin with open cells.

8. A machine according to claim 2, wherein said pad consists of a flexible container which is hermetically closed and completely filled with a non-compressible liquid.

9. A machine according to claim 8, wherein said non-compressible liquid is one of water, oil, and a gel exhibiting high viscosity.

10. A machine according to claim 8, wherein said container includes walls formed by sheets of soft plastic material.

11. A machine according to claim 1, wherein said sliding surface consists of a layer of fabric woven with synthetic fibers having a low coefficient of friction.

12. A machine according to claim 11, wherein said fabric has, on at least part of its surface confronting the surface of said plate, a layer of material which is impervious to fluids.

13. A machine according to claim 1, wherein the walls of said slit are covered by a layer of transparent anti-friction material.

14. A machine according to claim 1, wherein said plate made of transparent material has at least one end edge which is inclined with respect to the direction in which the conveyor rollers advance photosensitive materials in the machine and is adapted to wedge itself partially in a nip defined by said pair of conveyor rollers.

15. A machine according to claim 1, wherein said plate simply rests against said sliding supporting surface so as to weigh thereon.

16. A machine according to claim 1, and further comprising two or more pairs of rollers, inclusive of said conveyor rollers, which are arranged at the inlet end and at an outlet end of said slit, said rollers each having a steel core covered by a layer of soft elastic material which has a relatively large thickness.

17. A machine according to claim 16, wherein said layer is a foamed elastomer material with open or closed cells or a rubber or plastic material having an extremely low degree of hardness.

18. A machine according to claim 17, wherein each of said rollers have end pivots defining an axis of rotation therebetween, and seats rotatably supporting said end pivots with a substantially fixed center-to-center distance therebetween.

19. A machine according to claim 18, wherein said center-to-center distance is smaller than the outer diameter of each of the rollers so as to produce a compression in a substantially planar region of contact defined between the rollers of each pair.

20. A machine according to claim 18, and further comprising adjustment means operatively connected to said seats for moving said seats to adjust said center-to-center distance.

* * * * *